United States Patent
Liu et al.

(10) Patent No.: US 7,147,831 B2
(45) Date of Patent: Dec. 12, 2006

(54) CARBON NANOTUBE-BASED DEVICE AND METHOD FOR MAKING THE SAME

(75) Inventors: Liang Liu, Beijing (CN); Shou-shan Fan, Beijing (CN)

(73) Assignees: Tsinghua University, Beijing (CN); Hon Hai Precision Ind. Co., Ltd., Tu-Cheng (TW)

( * ) Notice: Subject to any disclaimer, the term of this patent is extended or adjusted under 35 U.S.C. 154(b) by 436 days.

(21) Appl. No.: 10/640,432

(22) Filed: Aug. 12, 2003

(65) Prior Publication Data

US 2004/0191158 A1   Sep. 30, 2004

(30) Foreign Application Priority Data

Mar. 25, 2003   (CN) .................................. 03 1 14057

(51) Int. Cl.
    *D01F 9/12*   (2006.01)
(52) U.S. Cl. ................. 423/447.2; 423/447.3; 423/447.1; 977/742; 977/840; 977/842
(58) Field of Classification Search ............. 423/447.3; 977/750, 840
See application file for complete search history.

(56) References Cited

U.S. PATENT DOCUMENTS

| | | | |
|---|---|---|---|
| 6,232,706 B1 * | 5/2001 | Dai et al. ............. | 313/309 |
| 6,758,957 B1 * | 7/2004 | Zhou et al. ........... | 205/109 |
| 6,764,874 B1 * | 7/2004 | Zhang et al. .......... | 438/99 |
| 7,060,356 B1 * | 6/2006 | Liu et al. ............. | 428/408 |

OTHER PUBLICATIONS

Yao, B. D., and N. Wang, "Carbon Nanotube Arrays Prepared by MWCVD," 2001, American Chemical Society, Journal of Physical Chemistry, vol. 105, pp. 11395-11398.*
Nature vol. 416 Apr. 4, 2002 p. 495 "Organized assembly of carbon nanotubes".
Applied physics letters vol. 79, No. 19 Nov. 5, 2001 p. 3155 "Electric field directed growth of aligned single-walled carbon nanotubes".
Science vol. 283 Jan. 22, 1999 p. 512 "Self-oriented regular arrays of carbon nanotube s and their field emission properties".

* cited by examiner

Primary Examiner—Colleen P. Cooke
Assistant Examiner—Rebecca M. Stadler
(74) Attorney, Agent, or Firm—Wei Te Chung

(57) ABSTRACT

A carbon nanotube-based device includes a substrate (10); a catalyst layer (13) disposed on the substrate, the catalyst layer comprising a number of nano-sized catalyst particles (131), a size of the catalyst particles decreasing along a given direction; and an array of aligned carbon nanotubes (14) extending from the catalyst layer in an arc toward the given direction. A method for making the carbon nanotube based device includes the steps of: (1) providing a substrate; (2) forming a catalyst layer on the substrate, a thickness of the catalyst layer decreasing along a given direction; (3) annealing the treated substrate in air to form nano-sized catalyst particles; (4) introducing a carbon source gas; and (5) forming an array of carbon nanotubes extending from the catalyst particles using a chemical vapor deposition method.

8 Claims, 1 Drawing Sheet

CARBON NANOTUBE-BASED DEVICE AND METHOD FOR MAKING THE SAME

BACKGROUND OF THE INVENTION

1. Field of the Invention

The present invention relates to a carbon nanotube-based device and a method for making such a carbon nanotube-based device. The application relates a contemporaneously filed application, titled "CARBON NANOTUBE ARRAY AND METHOD FOR MAKING SAME" and having the same applicants and the same assignee with the instant invention.

2. Description of Related Art

Carbon nanotubes are very small tube-shaped structures having the composition of a graphite sheet rolled into a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56–58). Carbon nanotubes have electrical conductance relate to their structure, and are chemically stable, and have very small diameters (less than 100 nanometers) and large aspect ratios (length/diameter). Due to these and other properties, it has been suggested that carbon nanotubes can play an important role in fields such as microscopic electronics, materials science, biology and chemistry.

Although carbon nanotubes promise to have a wide range of applications, better control is desirably needed over the building and organization of nanotubes-based architectures with controlled orientation. Chemical vapor deposition has been used to align nanotubes vertically on catalyst-printed substrates. For instance, a method for controlling the growth of aligned nanotubes in several directions on a substrate at once in a single process was reported in an article by B. Q. Wei et al. entitled "organized assembly of carbon nanotubes" (in Nature 416, 495–496, Apr. 4, 2002).

Another method for controlling the growth of carbon nanotubes by means of electric fields was reported in an article by Yuegang Zhang et al. entitled "Electric-field-directed growth of aligned single-walled carbon nanotubes" (Applied Physics Letters, Vol. 79, 19, Nov. 5, 2001).

However, carbon nanotubes of all the carbon nanotube based structures obtained by the above-mentioned methods are aligned along a linear direction, and/or extend perpendicularly from the substrates. Furthermore, the method of using an external field to control a growth direction of the carbon nanotubes is difficult to achieve localized complicated structures with multiple orientations of the carbon nanotubes. Therefore, diversified design of carbon nanotube-based devices is strictly limited.

SUMMARY OF THE INVENTION

In view of the above-described limitation, an object of the present invention is to provide a carbon nanotube-based device having a carbon nanotube array extending from a substrate in an arc toward a given direction.

Another object of the present invention is to provide a method for making the carbon nanotube-based device.

In order to achieve the objects set forth above, a carbon nanotube based device in accordance with the present invention comprises a substrate; a catalyst layer disposed on the substrate, the catalyst layer comprising a plurality of nano-sized catalyst particles, sizes of the catalyst particles decreasing along a given direction; and an array of aligned carbon nanotubes extending from the catalyst layer in an arc toward the given direction.

The method for making the carbon nanotube-based device in accordance with the present invention comprises the steps of: (1) providing a substrate; (2) forming a catalyst layer on the substrate with a thickness of the catalyst layer decreasing along a given direction; (3) annealing the treated substrate in air to form nano-sized catalyst particles; (4) introducing a carbon source gas; and (5) forming an array of carbon nanotubes extending from the catalyst particles using a chemical vapor deposition method.

Theoretically, the growth rate of carbon nanotubes is associated with a size of the catalyst particles used to grow them on. In a certain range, the smaller the catalyst particles are, the slower the growth rate of the carbon nanotubes is; the bigger the catalyst particles are, the faster the growth rate of the carbon nanotubes is. Thus, if the thickness of the catalyst layer is deliberately controlled during the step of depositing the catalyst layer, so that the thickness gradually changes along a given direction, then after annealing, the sizes of the obtained catalyst particles will vary in a controlled gradient distributed along the given direction. Due to van der Waals forces of attraction existing between the carbon nanotubes, the overall array of the carbon nanotubes formed will extend in an arc toward the given direction.

These and other features, aspects and advantages of the invention will become more apparent from the following detailed description, claims, and the accompanying drawings, in which:

DETAILED DESCRIPTION OF THE PRESENT INVENTION

A method for making a carbon nanotube-based device in accordance with the present invention comprises the steps of: (1) providing a substrate; (2) forming a catalyst layer on the substrate, a thickness of the catalyst layer decreasing along a given direction; (3) annealing the treated substrate in air to form nano-sized catalyst particles; (4) introducing a carbon source gas; and (5) forming an array of carbon nanotubes extending from the catalyst particles by a conventional chemical vapor deposition method.

Reference will now be made to the drawings to describe in detail a preferred method of the present invention.

Figure 1:
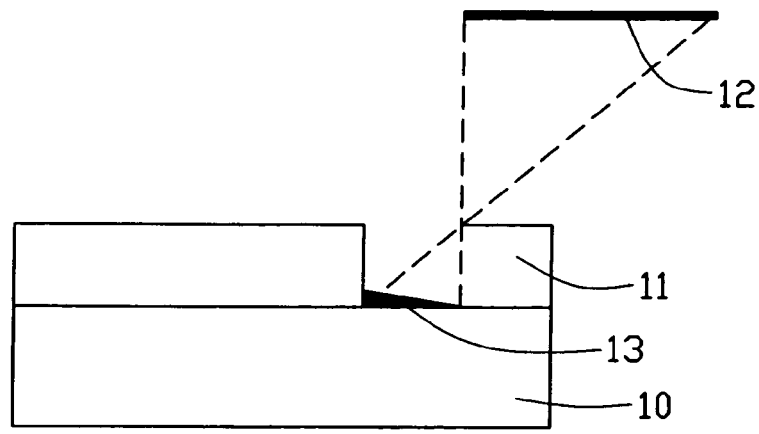
FIG. 1 is a schematic view of a procedure for depositing a catalyst layer on a substrate in accordance with a preferred embodiment of the present invention.

Referring to FIG. 1, a substrate 10 is first provided. The substrate 10 is generally made of porous silicon, polished silicon, glass or metal. A photoresist layer 11 is formed on the substrate 10, and a pattern thereof is defined using a photolithography method. A catalyst layer 13 is deposited on the substrate 10, with a thickness thereof decreases along a give direction such that carbon nanotubes to be formed can extend toward the given direction. Preferably, a thickness of a thicker end of the catalyst layer 13 is generally in the range from 5 nm to 10 nm, a thickness of a thinner end of the catalyst layer 13 is generally in the range from 1 nm to 5 nm.

In the preferred embodiment, the catalyst layer 13 is deposited using a thermal evaporation method or an electron beam evaporation method in cooperation with the photolithography method. A catalyst evaporating source 12 is made of iron, and has a linear structure. The catalyst evaporating source 12 is disposed obliquely above the area where the carbon nanotubes are to be formed, thereby obtaining the catalyst layer 13 having a gradient thickness. Alternatively, the catalyst evaporating source 12 can also be a point evaporating source which is linearly movable relative to the substrate 10. The catalyst evaporating source 12 generally comprises a material selected from the group of iron, cobalt, nickel, or any combination alloy thereof.

In an alternative method for depositing the catalyst layer, a patterned mask is placed adjacent the substrate to allow a selected surface area of the substrate to be exposed to a catalyst evaporating source. An evaporating source is then disposed obliquely above the selected surface area of the substrate. After depositing the catalyst layer on the substrate by evaporating the catalyst evaporating source, the mask is removed from the substrate.

In another alternative method for depositing the catalyst layer, a liquid film containing one or more of the above-mentioned catalyst materials is first coated on the substrate by spray coating. The substrate with the liquid film is spun to form a catalyst layer having a gradient thickness. Unwanted portions of the catalyst layer are then removed by a photolithography method.

Figure 2:
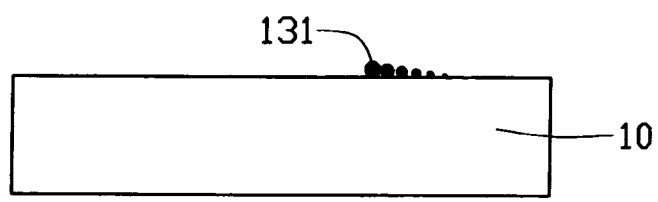
FIG. 2 is a schematic side view of the treated substrate of FIG. 1, showing a plurality of catalyst particles formed thereon.

Referring to FIG. 2, after removing the photoresist layer 11, the treated substrate 10 with the catalyst layer 13 is then annealed in air at 300–400° C., thereby oxidizing the catalyst layer 13 and forming nano-sized catalyst particles 131. Consequently, the thinner a portion of the catalyst layer 13 is, the smaller the catalyst particles 131 formed from that portion are. Similarly, the thicker a portion of the catalyst layer 13 is, the larger the catalyst particles 131 formed that portion are. Thereafter, the treated substrate 10 is placed in a furnace (not shown). A mixture of carbon source gas and protective gas is then introduced into the furnace at a predetermined temperature. The carbon source gas can be acetylene, ethylene, or any suitable chemical compound which contains carbon. The protective gas can be a noble gas or nitrogen. In the preferred method, acetylene is used as the carbon source gas, and argon is used as the protective gas. The protective gas and carbon source gas are introduced at suitable predetermined flow rates respectively. The mixture of carbon source gas and protective gas is introduced under these conditions for 5–30 minutes, thus forming the carbon nanotube array 14 extending from the substrate 10. More detailed information on growth of a carbon nanotube array is taught in U.S. Pat. No. 6,232,706 entitled "Self-oriented Bundles of Carbon Nanotubes and Method of Making Same". which is incorporated herein by reference. Due to van der Waals forces of attraction existing between the carbon nanotubes, the carbon nanotubes are bundled together and the array of the carbon nanotubes 14 extend in an arc toward the given direction.

Figure 3:
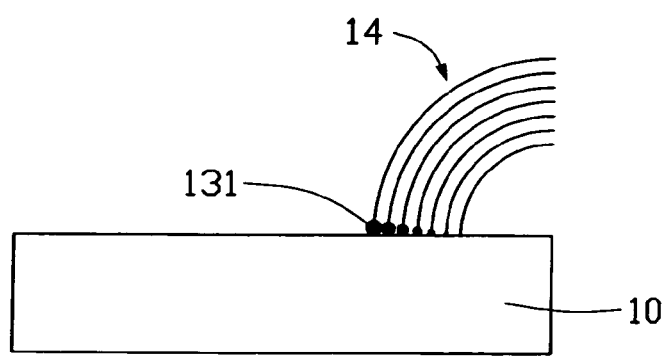
FIG. 3 is a schematic side view of a carbon nanotube-based device in accordance with the present invention.

Referring to FIG. 3, the resultant carbon nanotube-based device produced by the above-described method comprises the substrate 10, the catalyst layer 13 deposited on the substrate 10, and the array of aligned carbon nanotubes 14 extending from the catalyst layer 13 in an arc toward the given direction. Note that at this time the catalyst layer 13 comprises the nano-sized catalyst particles 131, and the size of the catalyst particles 131 decreases along the given direction.

While the present invention has been described with reference to particular embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. An apparatus comprising:
   a substrate;
   a catalyst layer disposed on the substrate, the catalyst layer comprising a plurality of nano-sized catalyst particles, sizes of the catalyst particles decreasing along a given direction; and
   an array of aligned carbon nanotubes extending from the catalyst layer in an arc toward the given direction, a respective length of each carbon nanotube being in proportion to the size of the catalyst particle from which such a nanotube is grown.

2. The apparatus as recited in claim 1, wherein the carbon nanotubes are bundled with each other.

3. The apparatus as recited in claim 1, wherein the catalyst layer comprises material selected from the group of iron, cobalt, nickel, or any combination alloy thereof.

4. The apparatus as recited in claim 1, wherein the substrate comprises material selected from the group consisting of silicon, alumina, glass and quartz.

5. The apparatus as recited in claim 1, wherein the substrate comprises porous silicon, polished silicon, glass or metal.

6. A carbon nanotube-based device comprising:
   a substrate;
   a catalyst layer disposed on the substrate and including a plurality of nano-sized catalyst particles, said catalyst layer having a gradient thickness along a predetermined direction on said substrate; and
   an array of aligned carbon nanotubes extending from said catalyst layer corresponding to said respective nano-sized catalyst particles, wherein
   lengths of said carbon nanotubes are varied along said predetermined direction in a manner corresponding to the gradient thickness of said catalyst layer along said predetermined direction.

7. The carbon nanotube-based device as recited in claim 6, wherein the thickness of said catalyst layer decrease along said predetermined direction.

8. The carbon nanotube-based device as recited in claim 7, wherein said lengths of the carbon nanotubes decrease along said predetermined direction.

* * * * *